No. 634,534. Patented Oct. 10, 1899.
E. F. MOENKE.
COMBINED CHURN AND BUTTER WORKER.
(Application filed May 1, 1899.)
(No Model.) 2 Sheets—Sheet 1.

Witnesses
Howard D. Orr

E. F. Moenke, Inventor
By his Attorneys,
C. A. Snow & Co.

No. 634,534. Patented Oct. 10, 1899.
E. F. MOENKE.
COMBINED CHURN AND BUTTER WORKER.
(Application filed May 1, 1899.)
(No Model.) 2 Sheets—Sheet 2.

Witnesses
Howard D. Orr.

E. F. Moenke, Inventor
By his Attorneys,
C. A. Snow & Co.

THE NORRIS PETERS CO., PHOTO-LITHO., WASHINGTON, D. C.

UNITED STATES PATENT OFFICE.

ERNEST F. MOENKE, OF LE SUEUR CENTRE, MINNESOTA.

COMBINED CHURN AND BUTTER-WORKER.

SPECIFICATION forming part of Letters Patent No. 634,534, dated October 10, 1899.

Application filed May 1, 1899. Serial No. 715,230. (No model.)

*To all whom it may concern:*

Be it known that I, ERNEST F. MOENKE, a citizen of the United States, residing at Le Sueur Centre, in the county of Le Sueur and State of Minnesota, have invented a new and useful Churn and Butter-Worker, of which the following is a specification.

My invention relates to a combined churn and butter-worker, and has for its object to provide a simple, compact, and efficient construction and arrangement of parts whereby the contents of the churn-receptacle are prevented from coming into contact with gearing or with other surfaces than those of the blades and beaters forming the working parts of the mechanism.

Further objects and advantages of this invention will appear in the following description, and the novel features thereof will be particularly pointed out in the appended claims, it being understood that the improvement is susceptible of various changes in the form, proportion, and size, and minor details of construction may be resorted to without departing from the spirit or sacrificing any of the advantages thereof.

To a full disclosure of the invention an embodiment thereof is shown in the accompanying drawings, wherein—

Figure 1:
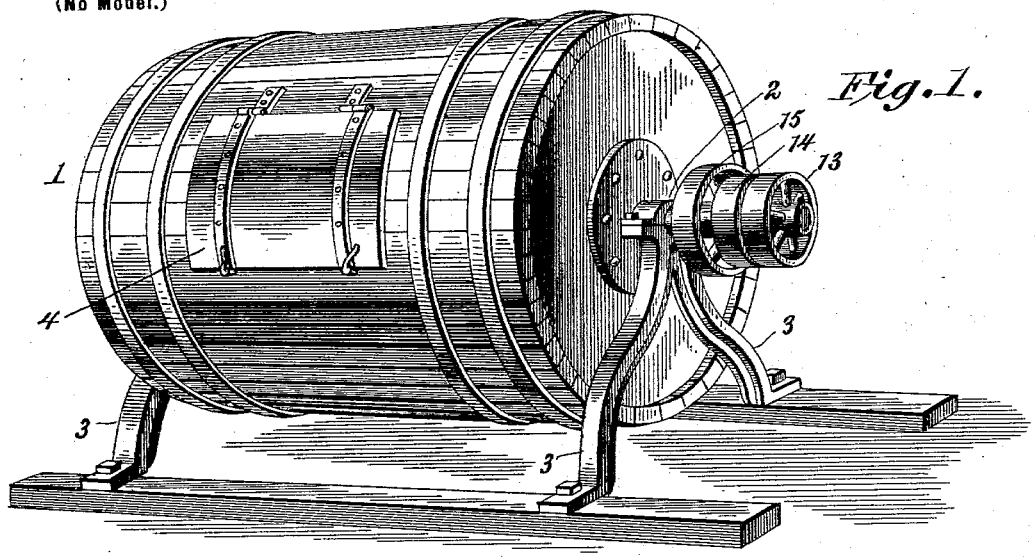
Figure 2:
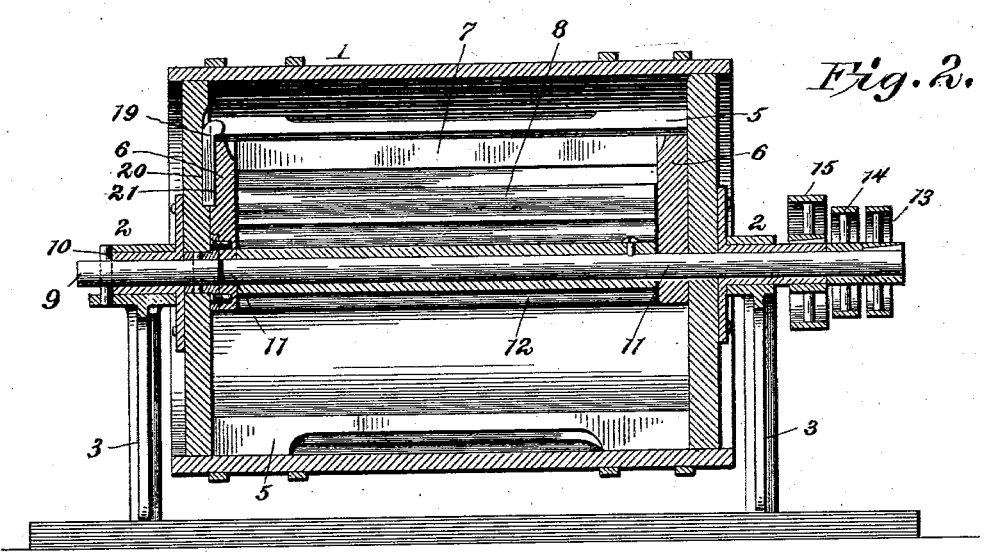
Figure 3:
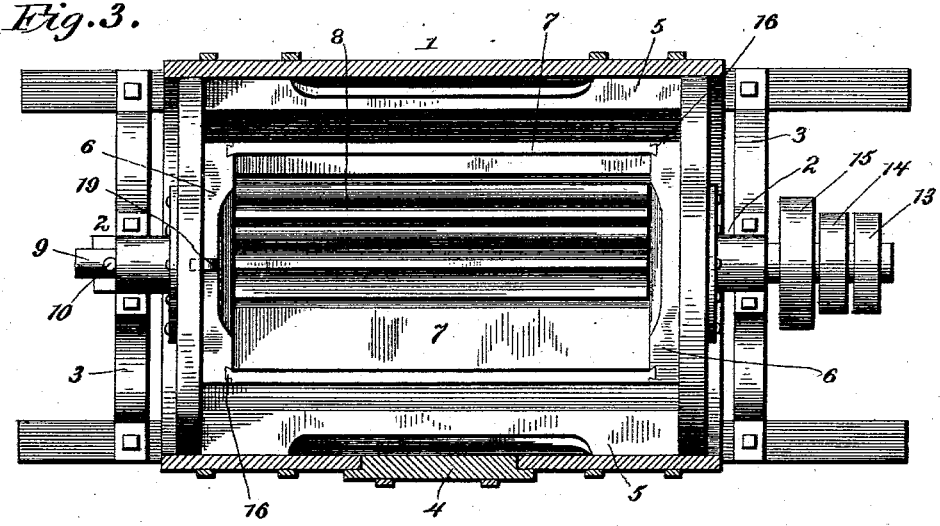
Figure 4:
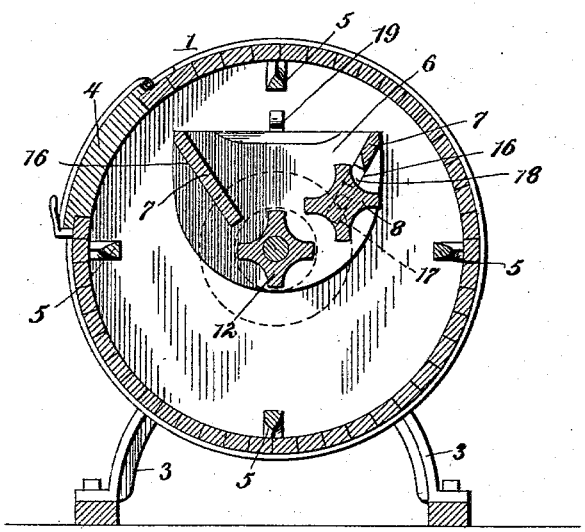
Figure 5:
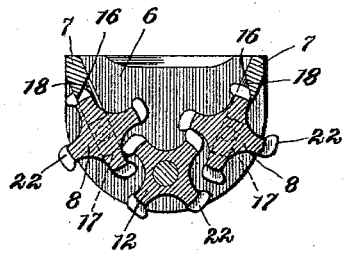

Figure 1 is a perspective view of an apparatus constructed in accordance with my invention. Fig. 2 is a longitudinal section of the same. Fig. 3 is a plan view showing the casing in section. Fig. 4 is a transverse section. Fig. 5 is a transverse section of the beater, showing means for communicating motion from the butter-working roller to the coöperating rollers of the beater.

Similar reference characters indicate corresponding parts in all the figures of the drawings.

The churn tub or receptacle 1 is provided with tubular trunnions or spindle portions 2, mounted in suitable bearings in the uprights 3 of a supporting-frame, said supporting-frame being of any preferred construction to suit the size of the apparatus and the power which is to be employed in driving the same, and said receptacle is provided at a suitable point with a movable cover 4 and with a series of interior paddles 5, which are cut away at their lower edges between their extremities to form passages between the paddles and the wall of the receptacle.

Arranged within the receptacle is a beater having heads 6, connected by blades or deflectors 7 and by one or more rollers 8, and projecting from one of the heads is a spindle 9, which extends through the adjacent tubular trunnion or spindle portion of the receptacle to a point beyond the latter and is secured in a fixed position by a pin 10 or the equivalent thereof. Mounted between the heads of the beater, with trunnions or spindle portions 11 fitted in bearings in the heads, is a butter-working roller 12, one of said trunnions or spindle portions of the butter-working roller being extended beyond the bearing in a head and through the tubular trunnion of the receptacle and being fitted beyond the latter with fixed and loose pulleys 13 and 14 when the apparatus is to be driven by mechanical means, it being understood that other means adapted to be actuated manually may be substituted therefor. Also fitted upon one of the trunnions of the receptacle is a belt-wheel 15 or other analogous operating device.

In the illustrated construction of beater the blades or deflectors 7 are terminally and removably fitted in guides 16, formed in the inner or opposing surfaces of the heads 6, the extremities of the blades being dovetailed to correspond with the cross-sectional contour of the guides, and the roller 8, of which only one is shown in the preferred form of the apparatus, has its trunnions fitted in longitudinal bearings 17, communicating with one of said guides. Bearing-blocks 18 may be arranged in said bearings between the trunnions of the roller and the inner edges of the blades or deflectors to hold said parts out of contact and provide for the operative revolution of the rollers.

From the above description it will be seen that the churn-receptacle is revoluble and that by means of the interior blades which it carries the contents of the same may be raised and deposited in the beater, of which the members are disposed in downwardly-convergent series, the butter-working roller being located at the point of intersection of said series. Obviously the liquid flows back into the lower portion of the receptacle through the intervals between the blades or beaters and the rollers and is again lifted by the interior paddles of the receptacle to cause the necessary agitation to separate the butter.

When the butter has been properly separated and it is desired to gather and work the same, the churn-receptacle should be secured in a fixed position with relation to the beater by means of a key 19 engaging registering seats 20 and 21 formed in the opposing surfaces of one of the beater-heads and the adjacent head of the cylinder constituting the churn-receptacle, as shown in Fig. 2, whereupon the belt (not shown) may be shifted to the fixed pulley on the spindle of the butter-worker to cause the roller constituting the butter-worker to rotate. With the butter-working roller the roller 8 of the beater coöperates, and the passage of the butter between the roller causes the efficient removal of liquid therefrom.

If preferred, a plurality of rollers may be employed in the beater for coöperation with the butter-working roller, as shown in Fig. 5; but in this case I preferably provide the rollers with intermeshing gear-teeth 22, preferably constructed of wood or of the material of which the rollers are made. Also in practice the rollers are longitudinally corrugated, whereby the wings of one roller intermesh to a certain extent with those of the other.

Having described my invention, what I claim is—

1. The combination with a supporting-frame, of a revoluble churn-receptacle provided with a series of interior passages having tubular trunnions of which one is provided with means for communicating motion to the receptacle, a beater mounted in the receptacle and having heads connected by blades or deflectors and by one or more rollers, and a spindle projecting from one of the heads and located in one of the trunnions, said spindle projecting beyond the trunnion in which it is located, means for securing the spindle of the beater in a fixed position, and a butter-working roller mounted within the beater below the plane of the one or more rollers also carried thereby and having one of its trunnions extended through the other trunnion of the receptacle and beyond the same, and provided with means whereby rotary motion may be communicated thereto.

2. The combination with a revoluble churn-receptacle having internal blades, of an inclosed stationary beater having spaced members arranged in downwardly-converging series, and a revoluble butter-worker interposed between said downwardly-converging members.

3. The combination with a revoluble churn-receptacle having interior blades cut away at their outer edges to form a passage between the same and the walls of the receptacle, of a stationary beater having terminal heads removably keyed in the said receptacle and provided with downwardly and inwardly inclined connecting blades or deflectors, a roller under the lower terminal of one of the blades or deflectors of the beater, and a butter-working roller also mounted in the beater below the roller and centrally thereon.

4. The combination with a revoluble churn-receptacle having interior blades, of a stationary beater arranged within the receptacle and having spaced heads provided with dovetailed guides which are downwardly and inwardly inclined, blades or deflectors having extremities shaped similarly to the guides and removably fitted in the latter, a roller having its trunnions mounted in one of said guides, and a butter-working roller mounted at the lowermost point of the beater.

5. The combination with a revoluble churn-receptacle having interior blades, of a stationary beater arranged within the receptacle and having spaced heads provided with downwardly and inwardly inclined dovetailed guides, blades having extremities shaped similarly to said guides and removably fitted therein, one of the guides being elongated to form a bearing, a corrugated roller having its trunnions mounted in said bearing, bearing-blocks interposed between the trunnions of said roller and the inner edge of the adjacent blade, and a butter-working roller mounted within the beater below the corrugated roller for coöperation with the latter.

In testimony that I claim the foregoing as my own I have hereto affixed my signature in the presence of two witnesses.

ERNEST F. MOENKE.

Witnesses:
WILLIAM R. MAHOOD,
CHARLES H. PURRINGTON.